Patented Dec. 29, 1953

UNITED STATES PATENT OFFICE 2,664,410

PLASTICIZED HALOGEN-CONTAINING RESINS

Joseph R. Darby, Richmond Heights, and Louis E. Wells, Jr., Webster Groves, Mo., assignors to Monsanto Chemical Company, St. Louis, Mo., a corporation of Delaware No Drawing. Application October 1, 1951, Serial No. 249,214

14 Claims. (Cl. 260—23)

This invention relates to plasticized halogen-containing resin compositions exhibiting improved anti-blocking properties and improved lubricity. More particularly this invention relates to plasticized halogen-containing vinylidene resins exhibiting improved anti-blocking properties and improved lubricity.

The object of this invention is to provide a class of materials which may be manufactured at low cost and which when incorporated into a plasticized halogen-containing resin composition improve its stability, decrease its blocking characteristics and at the same time improve its lubricity.

"Blocking" is a term employed to describe the tendency of sheeted or calendered resinous compositions to cohere when the compositions are placed in contact. Materials which are employed to reduce this cohesion tendency are called "anti-blocking agents."

"Lubricity" is a term employed to describe the ease of movement of a resinous composition over metal surfaces such as is used in molding or extrusion apparatus. Materials which are employed to improve the lubricity of resinous compositions are called "lubricants."

It is well recognized in the art that materials, more specifically lubricants, which are primarily used to prevent sticking of resinous compositions, particularly halogen-containing resin compositions, to molds or the surfaces or nozzles of extrusion apparatus do not have the effect of anti-blocking materials in producing an anti-blocking action. In other words anti-blocking action is distinguished from a distinctly lubricating action.

It has been suggested in the art that certain esters of unsaturated fatty acids function as heat and light stabilizers for plasticized halogen-containing resins.

In accordance with this invention it has been discovered that a partial ester of the general formula

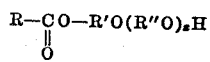

where R' and R'' are like or unlike alkylene groups, where $x$ is an integer from 0 to 5, and where

is the acyloxy group derived from a mixture of aliphatic and resin acids, when incorporated in small quantities in a plasticized halogen-containing resin composition, in addition to stabilizing the composition greatly reduces the tendency of the calendered or sheeted films to cohere or block when placed in contact and, further, prevents sticking of the halogen-containing resin composition to the metal surfaces of the molding or extrusion apparatus. R' and R'' may also contain hydroxyl groups.

This remarkable result is dependent upon the two different acids being mixed prior to the formation of the partial ester, however, the reaction is not completely understood. If the partial esters of the two different acids are separately prepared and then mechanically mixed the unique effect is not produced.

The partial esters of this invention are prepared by several well-known methods. For example by reacting, in proper proportions, ethylene oxide, propylene oxide, trimethylene oxide, epichlorhydrin, glycerol chlorhydrin, ethylene glycol, trimethylene glycol, propylene glycol, diethylene glycol, triethylene glycol, glycerol, polyglycerol, and the like or mixtures thereof with a mixture of organic acids, at least one of which is a resin acid and the others are aliphatic or fatty acids.

A typical resin acid as described in this application is known as an abietic acid, the chemical constitution of which has been suggested as follows:

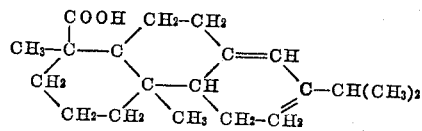

The preferred method of carrying out the present invention is to employ a partial ester of the general formula,

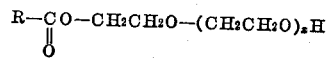

where

and $x$ have the same significance as aforenoted. These esters are prepared by reacting the mixed acids with at least an equimolecular proportion of ethylene oxide. The partial esters obtained by the reaction of the mixed acids with at least equimolecular proportions of alkylene oxides other than ethylene oxide such as propylene oxide, i. e.,

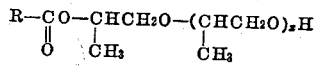

trimethylene oxide, i. e.,

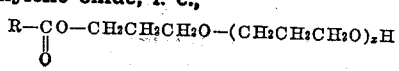

etc., are also effective lubricants and anti-blocking agents.

Among the acid mixtures contemplated are the following:

| Aliphatic acid | plus | Resin acid |
|---|---|---|
| (1) Oleic acid | | Abietic acid ($C_{20}H_{30}O_2$) |
| (2) Stearic acid | | Abietic acid |
| (3) Stearic acid | | Pimaric acid ($C_{20}H_{30}O_2$) |
| (4) Lauric acid | | Abietic acid |
| (5) Palmitic acid | | Pimaric acid |
| (6) Oleic acid, stearic acid | | Abietic acid |
| (7) Oleic acid, lauric acid | | Abietic acid |
| (8) Stearic acid, oleic acid, lauric acid | | Abietic acid, pimaric acid |
| (9) Myristic acid | | Abietic acid |
| (10) Ethyl hexoic acid | | Abietic acid |

The mixture of organic acids may contain any number of different aliphatic fatty acids and the only limiting factor is that at least one of the other acids shall be of the resin acid type. Isomers of the respective aliphatic and resin acids may also be used. The aliphatic fatty acid and the resin acid may each be varied within limits so that each acid may comprise 20% to 80% of the total mixed acid. The preferred aliphatic fatty acids are those containing 12-18 carbon atoms.

It has been further found that a cheap and plentiful source of a mixture of aliphatic and resin acids are oils known as tall oils. The tall oils vary in composition, for example the aliphatic fatty acids in different grades varying from 20% to 60% and the resin acids from 10% to 60%. The balance of materials consisting of sterols, higher alcohols and other constituents having little or no effect on the process of this invention. Such tall oils may be used as the raw materials in the preparation of the partial esters of this invention or the aliphatic acid or acids and the resin acid or acids may be mechanically mixed prior to the formation of the partial ester.

To illustrate the lubricity of a halogen-containing resin composition containing a partial ester of this invention the beta-hydroxy ethyl ester of tall oil

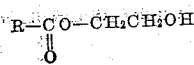

where

is the acyloxy group derived from tall oil, is compounded in a plasticized polyvinyl chloride composition employing a differential speed two-roll mill at 165° C. to obtain a homogeneous product and compared to an identically prepared composition with the exception of the inclusion of the partial ester. The compositions in parts by weight and results obtained are set forth below:

| Polyvinyl chloride | Dioctyl phthalate | Beta-hydroxy ethyl ester of tall oil | Remarks |
|---|---|---|---|
| 100 | 50 | None | Could not be removed from roll mill at 165° C. |
| 100 | 50 | 1 | Removeable from roll mill at 165° C. |
| 100 | 50 | 2 | Removal smooth and facile at 165° C. |

To illustrate the anti-blocking properties of a halogen-containing resin composition containing a partial ester of this invention the following compositions are prepared employing the same manipulative procedure to obtain a homogeneous product:

| Composition | A | B | C |
|---|---|---|---|
| Polyvinyl chloride......parts by weight.. | 100 | 100 | 100 |
| Di-octyl phthalate......do.... | 50 | 50 | 50 |
| Beta-hydroxy ethyl ester of tall oil......do.... | | 1 | 2 |

Films of about 0.020 inch in thickness are formed from the respective compositions. Two strips (1″ by 6″) are cut from the central portion of each film, pressed face to face between glass plates under a pressure of 0.17 lb. per sq. in. (1 pound total pressure for the 1″ by 6″ strip) for 30 minutes while they are heated to a temperature of 180° F. and are then allowed to cool to room temperature while under the aforesaid pressure. The glass plates are removed and the strips tested for surface cohesion by pulling the strips apart on a Scott tensile tester. The cohesive force (average of four tests) in pounds per inch for composition A is about 10 times that of composition B and about 15 times that of composition C. Cohesive force is the force in lbs. per inch width necessary to pull apart the cohered surfaces of the strips.

Employing the following partial esters

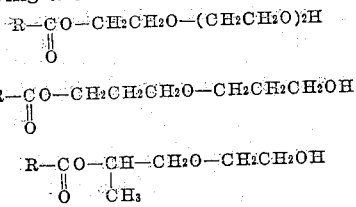

where

is the acyloxy group derived from tall oil, respectively, in place of the beta-hydroxy ethyl ester of tall oil in the above example and evaluating under the same conditions as above substantially the same improved results are obtained.

The partial esters of this invention may be added to the halogen-containing resin at any time before, during or after plasticization of the resin, although it is preferred to add them before heat processing the composition. They may conveniently be added by dissolving in the plasticizer before adding the latter to the resin. The amount of the partial ester of this invention employed may vary widely and still produce improvements in lubricity and anti-blocking properties. Usually from 0.1% to 5% by weight on the halogen-containing resin is satisfactory, however, amounts outside this range may be employed depending upon the particular resin, other compounding materials, and the results desired. In general it is preferred to employ 0.5% to 2% by weight based on the halogen-containing resin.

Although the partial esters of this invention are effective in halogen-containing resins incorporating any of the ordinary plasticizers, the most satisfactory results are obtained with those plasticizers which are completely organic in nature, such as dibutyl phthalate, dioctyl phthalate, butyl phthalyl butyl glycollate, dibutyl sebacate, and the like. Very satisfactory results are also obtained when the partial esters of this invention are used in conjunction with the phosphate ester plasticizers such as the well known alkyl diaryl phosphates in which the alkyl group contains 6-14 carbon atoms and the aryl groups are phenyl or cresyl groups or mixtures thereof, e. g., 2-ethylhexyl-diphenyl phosphate, dodecyl dicresyl phosphate, tricresyl phosphate, etc. The amount of plasticizer which is used may be widely varied depending upon the particular plasticizer, the particular halogen-containing resin, and the particular use contemplated for the plasticized composition. Usually, however, from 10–100 parts of the plasticizer or mixture of plasticizers are used for every 100 parts of the halogen-containing resin.

Pigments, fillers, etc., which are commonly used in the plastic industries may be incorporated in the halogen-containing resins without destroying the anti-blocking or lubricity effect of the partial esters of this invention.

A halogen-containing resin composition particularly exhibiting the improved properties of this invention is one containing 25 to 40 parts dioctyl phthalate, 15 to 25 parts of a liquid partially hydrogenated mixed isomeric terphenyl known as HB-40, and 0.5 to 2 parts of the beta hydroxy ethyl ester of tall oil for every 100 parts of a vinyl-chloride resin.

The halogen-containing resins of this invention are those derived from such vinylidene compounds as vinyl chloride, vinylidene chloride, vinyl chloracetate, chloro styrene, chlorobutadienes, etc. and those copolymers of such vinylidene compounds and other unsaturated materials copolymerizable therewith, for example, copolymers of a vinylidene halide such as vinyl chloride with such materials as vinylidene chloride, vinyl esters of carboxylic acids, for example, vinyl acetate, vinyl propionate, vinyl butyrate, vinyl benzoate; esters of unsaturated acids, for example, alkyl acrylates, such as methyl acrylate, ethyl acrylate, propyl acrylate, butyl acrylate, allyl acrylate and the corresponding esters of methacrylic acid; vinyl aromatic compounds, for example styrene, ortho - chloro - styrene, para-chlorostyrene, 2,5-dichloro-styrene, 2,4-dichloro-styrene, para-ethyl styrene, divinyl benzene, vinyl naphthalene, alpha-methyl styrene; dienes, such as butadiene, chlorobutadiene; unsaturated amides, such as acrylic acid amide, acrylic acid anilide; unsaturated nitriles, such as acrylic acid nitrile; esters of $a,b$-unsaturated carboxylic acids, for example, the methyl, ethyl, propyl, butyl, amyl, hexyl, heptyl, octyl, allyl, methallyl, and phenyl esters of maleic, crotonic, itaconic, fumaric acids and the like. The class of copolymers in which a predominant proportion, i. e., more than 50% by weight of copolymer is made from a halogen-containing vinylidene compound such as vinyl chloride, represents a preferred class of resins to be treated in accordance with this invention.

A particularly preferred embodiment of the invention comprises the improvement of lubricity and anti-blocking properties of resins prepared by copolymerizing vinyl chloride and an ester of an $a,b$-unsaturated dicarboxylic acid such as diethyl maleate or other esters of maleic, fumaric, aconitic, itaconic acids, etc., in which 5–20 parts by weight of diethyl maleate or other analogous ester are used for every 95–80 parts by weight of vinyl chloride. Among the preferred esters of $a,b$-unsaturated dicarboxylic acids are the alkyl esters in which the alkyl group contains 1–8 carbon atoms.

The partial esters of this invention are also effective in halogen-containing resins containing halogens other than chlorine, e. g., bromine, fluorine and iodine. The halogen-containing resins may contain a varying proportion of halogen depending upon the nature of the resin and its contemplated use.

The present invention is not limited except as defined by the appended claims which are part of the present specification.

What is claimed is:

1. A composition comprising a plasticized vinyl chloride resin and the beta-hydroxy ethyl ester of tall oil.

2. A composition comprising a plasticized vinyl chloride resin and 0.1% to 5% based upon the weight of the resin of the beta-hydroxy ethyl ester of tall oil.

3. A composition comprising a vinyl chloride resin, di-octyl phthalate, and 0.5% to 2% based upon the weight of the resin of the beta-hydroxy ethyl ester of tall oil.

4. A composition comprising a vinyl chloride resin, di-octyl phthalate, a liquid partially hydrogenated mixed isomeric terphenyl, and 0.5% to 2% based upon the weight of the resin of the beta-hydroxy ethyl ester of tall oil.

5. A composition comprising a halogenated vinylidene polymer and a partial ester of the structural formula

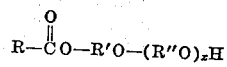

where R' and R" are alkylene groups, where $x$ is an integer from 0 to 5, inclusive, and where

represents the mixture of acyloxy groups obtained from tall oil by removal of the hydrogen atoms of the carboxyl groups of the mixture of acids of tall oil, which mixture of acids is represented by the structure

6. A composition comprising a plasticized chlorinated vinylidene polymer and a partial ester of the structural formula

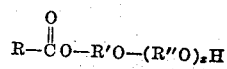

where R' and R" are ethylene groups, where $x$ is an integer from 0 to 5, inclusive, and where

represents the mixture of acyloxy groups obtained from tall oil by removal of the hydrogen atoms of the carboxyl groups of the mixture of acids of tall oil, which mixture of acids is represented by the structure

7. A composition comprising a plasticized chlorinated vinylidene polymer and a partial ester of the structural formula

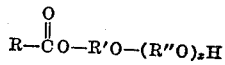

where R' and R" are propylene groups, where $x$ is an integer from 0 to 5, inclusive, and where

represents the mixture of acyloxy groups obtained from tall oil by removal of the hydrogen atoms of the carboxyl groups of the mixture of acids of tall oil, which mixture of acids is represented by the structure

3. A composition comprising a plasticized chlorinated vinylidene polymer containing at least 50% by weight vinyl chloride and a partial ester of the structural formula

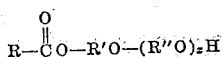

where R' and R'' are ethylene groups, where $x$ is 2, and where

represents the mixture of acyloxy groups obtained from tall oil by removal of the hydrogen atoms of the carboxyl groups of the mixture of acids of tall oil, which mixture of acids is represented by the structure

9. A composition comprising a halogenated vinylidene polymer and a preformed mixed partial ester of the structural formula

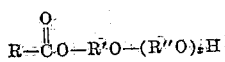

where R' and R'' are alkylene groups, where $x$ is an integer from 0 to 5, inclusive, and where

represents the mixture of acyloxy groups obtained from a mixture of acids represented by the structure

by removal of the hydrogen atoms of the carboxyl groups of the mixture of acids, 20% to 80% by weight of said mixture of acids being resin acid and the balance being aliphatic fatty acids containing from 8 to 18 carbon atoms, inclusive, said preformed mixed partial ester being prepared by reacting said mixture of resin acid and aliphatic acid with an esterifying agent capable of introducing the —R'O—(R''O)$_x$H grouping.

10. A composition comprising a plasticized chlorinated vinylidene polymer containing at least 50% by weight vinyl chloride and a preformed mixed partial ester of the structural formula

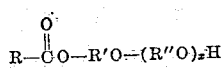

where R' and R'' are alkylene groups, where $x$ is an integer from 0 to 5, inclusive, and where

represents the mixture of acyloxy groups obtained from a mixture of acids represented by the structure

by removal of the hydrogen atoms of the carboxyl groups of the mixture of acids, 20% to 80% by weight of said mixture of acids being abietic acid and the balance being aliphatic fatty acids containing from 12 to 18 carbon atoms, inclusive, said preformed mixed partial ester being prepared by reacting said mixture of abietic acid and aliphatic acids with an esterifying agent capable of introducing the

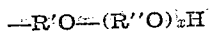

grouping.

11. The composition of claim 10 in which the plasticizer is a phosphate ester plasticizer.

12. The composition of claim 10 in which the plasticizer is an alkyl diaryl phosphate wherein the alkyl group contains 6–14 carbon atoms and the aryl radicals are selected from the group consisting of phenyl and cresyl radicals.

13. The composition of claim 10 wherein the chlorinated vinylidene polymer is a vinyl chloride-vinyl acetate copolymer containing at least 50% by weight vinyl chloride.

14. The composition of claim 10 wherein the chlorinated vinylidene polymer is a vinyl chloride-diethyl maleate copolymer in which at least 80% by weight is made from vinyl chloride.

JOSEPH R. DARBY.
LOUIS E. WELLS, Jr.

References Cited in the file of this patent

UNITED STATES PATENTS

| Number | Name | Date |
|---|---|---|
| 2,098,549 | Charch | Nov. 9, 1937 |
| 2,194,013 | Dennison | May 19, 1940 |